US011679704B1

(12) United States Patent
Gillan (10) Patent No.: US 11,679,704 B1
(45) Date of Patent: Jun. 20, 2023

(54) DEVICE AND METHOD FOR SETTING OR REMOVING SEAT TRIM (71) Applicant: GRA-MAG Truck Interior Systems, L.L.C., London, OH (US)

(72) Inventor: Lukas Gillan, London, OH (US)

(73) Assignee: GRA-MAG Truck Interior Systems, L.L.C., London, OH (US)

( * ) Notice: Subject to any disclaimer, the term of this patent is extended or adjusted under 35 U.S.C. 154(b) by 0 days.

(21) Appl. No.: 17/687,241

(22) Filed: Mar. 4, 2022

(51) Int. Cl.
*B25B 27/14* (2006.01)
*B25B 25/00* (2006.01)
*B60N 2/72* (2006.01)
*B60N 2/58* (2006.01)

(52) U.S. Cl.
CPC ............. *B60N 2/72* (2013.01); *B60N 2/5825* (2013.01)

(58) Field of Classification Search
CPC ..... B25C 11/00; B25B 27/0092; B25B 27/14; B25B 27/00; B60N 2/70; B60N 2/7005; B60N 2/72; B60N 2/7011; B60N 2/5825
See application file for complete search history.

(56) References Cited

U.S. PATENT DOCUMENTS

| 4,833,780 | A | * | 5/1989 | Pollock | B26F 1/32 30/368 |
| D314,321 | S | * | 2/1991 | Johnston | D8/89 |
| 5,870,786 | A | * | 2/1999 | Papadopoulos | B44D 3/164 7/105 |
| 6,663,082 | B1 | * | 12/2003 | Ploeger | B25C 11/00 254/129 |
| 6,994,322 | B1 | * | 2/2006 | Wittman | A44B 15/005 254/131 |
| D567,052 | S | * | 4/2008 | Vandenberghe | B66F 15/00 D8/89 |
| 9,315,134 | B2 | * | 4/2016 | Kheil | B60N 2/5891 |
| 9,505,111 | B2 | * | 11/2016 | Dorsey | B25B 27/0092 |
| 9,783,089 | B2 | * | 10/2017 | Kheil | B60N 2/70 |
| D845,094 | S | * | 4/2019 | Chiu | D8/14 |
| 10,336,226 | B2 | * | 7/2019 | Voigt | B65D 33/2508 |
| 10,625,645 | B2 | * | 4/2020 | Baisch | B60N 2/7017 |
| 2008/0035900 | A1 | * | 2/2008 | Flores | B25B 33/00 254/21 |
| 2011/0016688 | A1 | * | 1/2011 | Townsend | B25C 11/00 254/131 |
| 2014/0259605 | A1 | * | 9/2014 | Dorsey | B25B 27/0035 29/253 |
| 2015/0130255 | A1 | * | 5/2015 | Kheil | B60N 2/72 29/525.08 |
| 2016/0214516 | A1 | * | 7/2016 | Kheil | B60N 2/70 |
| 2018/0236914 | A1 | * | 8/2018 | Voigt | A47C 31/023 |
| 2019/0143862 | A1 | * | 5/2019 | Fujikake | B60N 2/5825 297/228.13 |
| 2021/0228411 | A1 | * | 7/2021 | de Juan | A61B 18/1485 |
| 2022/0040832 | A1 | * | 2/2022 | Schultz | B25B 25/00 |

OTHER PUBLICATIONS

Hope Global, Automotive, webpge, accessed Jun. 7, 2022, 4 pages.

* cited by examiner

*Primary Examiner* — Shin H Kim
(74) *Attorney, Agent, or Firm* — Standley Law Group LLP; Jeffrey S. Standley; Bryan P. Finneran (57) ABSTRACT

A device and method for setting trim on or removing trim from seats. An assembly in accordance with the present invention may include a handle and any number of inserts may be used by a single operator for either settling or removing trim from a seat, such as an automobile seat. The assembly may provide for ease of manually driving and removing trim edge members with respect to receivers.

20 Claims, 10 Drawing Sheets

DEVICE AND METHOD FOR SETTING OR REMOVING SEAT TRIM

CROSS-REFERENCE TO RELATED APPLICATIONS

This application is an original filing, and does not claim priority to any other foreign or domestic filing.

TECHNICAL FIELD

Embodiments of the present disclosure relate to a device and method for setting or removing trim on seats. More particularly, exemplary embodiments relate to a novel device and method involving a handle and any number of different arms or inserts adapted to connect to said handle in an assembly to be used by a single operator for either settling or removing trim from a seat, such as an automobile seat.

BACKGROUND AND SUMMARY OF THE INVENTION

Setting trim ("trim setting" or "trim installation") refers generally to installing an outermost layer of material ("trim," "trim layer," "cover," or "cover layer"), such as fabric, textile, cloth, or the like, to a seat comprising soft material, such as, by way of example and not limitation, automobile seat upholstery. Traditional methods of trim setting involve directly affixing the trim to edge regions of a seat assembly using a number of pins, staples, adhesive, or the like at a perimeter of the trim. One issue with the traditional methods is that they are labor intensive, as the trim must be affixed to edge regions using pins, staples, adhesive, or the like across the entire length of the perimeter of the trim. Alternatively, machines may be employed to execute the traditional methods, but the machines may be expensive and unavailable for certain repairs. Another issue with the traditional methods is the potential for trim tearing or dislodgment at one or more attachment points. Trim tearing or dislodgment may be caused by any number of individual or repeated applications of force(s) causing high tension and/or wear at one or more regions of the trim, where the tension and/or wear in the trim exceeds what certain portions of the trim attached to edge regions by pins, staples, adhesive or the like are capable of withstanding.

A popular solution to issues of trim tearing and dislodgment with the traditional methods is to employ clips, catches, snaps, hooks, clasps, or the like ("receivers") across one or more attachment regions of the seat for receiving one or more firm yet moderately pliable members extending along and securely attached to an entire perimeter of the trim ("trim edge members"), such that the trim is unlikely to be torn or dislodged from the attachment regions. For example, by way of illustration and not limitation, beaded duon trim setting involves embedding clips as receivers in non-trim seat material, such as, by way of example and not limitation, interior foam, and employing beads of firm yet moderately pliable material, which may be securely attached to duon(s), as trim edge members, where the beads are inserted into respective clips to tightly secure the trim around the seat. The duon(s) may comprise fabric, textile, cloth or the like, and a portion of the duon may be sown into a cover of a seat. The beads may comprise an elongate plastic member having a narrow channel positioned between two walls, wherein a portion of the duon may be secured within the narrow channel between the two walls.

A significant amount of force may be required to drive a trim edge member, such as a bead, into a receiver, such as a clip, in order to tightly secure the trim to interior foam of a seat. Certain manufacturers may utilize machines at their facilities to set trim, where a driving force provided by the machine may cause trim edge members to be secured in the receivers. However, other manufactures, as well as automobile dealerships, automobile service centers, automobile service workers, automobile owners, and the like often lack the space, financing, and/or other means for utilizing these machines.

Alternatively, one may set trim by manually driving trim edge members into the receivers without the use of an aforementioned machine. For instance, one may use his or her fingers to provide the driving force to cause the trim edge members to be secured in the receivers (the "finger method"). However, the repeated use of one's fingers to do this may be strenuous or even damaging on one's fingers. Furthermore, the finger method requires a high degree of skill and finesse to prevent damage to the interior foam caused by, for example, pressure from one's fingers and/or incidental movement of a receiver caused by one's fingers. For example, by way of illustration and not limitation, one may accidentally force a clip through interior foam when attempting to manually drive a bead into the clip, thus interfering with further trim setting. Additionally, the finger method is highly time consuming.

A similar variation of the finger method is to employ a flat head screwdriver to drive the trim edge members into the receivers (the "screwdriver method"). The screwdriver method may allow for faster trim installation than the finger method, but it may also require more skill than the finger method, as misplacement of the screwdriver when force is applied thereto may cause damage to the duon, trim edge member, another portion of the seat, or even to one's body if the screwdriver is accidentally driven into one's fingers, palm, or the like. In addition, neither the finger method nor the screwdriver method are useful when removal of the duon from the receivers is required, such as when removal of a cover layer is desired, as even more work and skill may be required to execute removal of trim than is required to install trim.

In view of this, it would be helpful to provide a device and method for setting trim on seats involving a handle and an arm, such as by way of example and not limitation, an arm adapted to be temporarily connected to the handle (referred to herein as "insert"), wherein the device and method may be useful for a single operator to either set or remove trim from a seat, such as an automobile seat. Accordingly, the present invention is directed to a device and method for setting and removing trim from seats involving a handle and insert assembly providing for ease of manually inserting and removing trim edge members with respect to receivers.

Exemplary embodiments of the present invention may provide primary advantages of allowing for seat trim to be installed by individuals who lack experience or skill with trim setting. Furthermore, exemplary embodiments of the present invention provide a primary advantage of allowing for trim to be installed in a fraction of the time required with previous manual methods. Additionally, exemplary embodiments of the present invention are useful for both installation and removal of trim. Also, with exemplary embodiments of the present invention, a machine is not required for trim installation or removal, thus exemplary embodiments may save a user the time, space, and money which would otherwise be required to purchase and install a machine.

According to the present invention in one aspect, a handle and one or more inserts may be provided. A number of different inserts of various sizes may be provided to allow for the installation of trim edge members and duons of any number of different sizes, including by way of example and not limitation, various sized plastic beads of any number of different duon profiles. A portion of the insert may be positioned inside an interior space of the handle. The insert may be secured with respect to the handle by the action of one or more fasteners, pins, buckles, or the like causing attachment between the handle and the insert. For example, by way of illustration and not limitation, a plurality of fasteners may each be positioned in a threaded channel extending from the handle to the insert. A first insert may be replaced with a second insert be removing the fasteners from the first insert and the handle and reapplying the fasteners to the handle and the second insert.

A profile engagement portion of an exemplary arm may be slid over a profile of a trim edge member. As a result, the exemplary arm may be permitted to slide along a length of the trim edge member while being vertically restricted thereto. The profile engagement portion may be placed in close proximity to a receiver while still being vertically restricted to the trim edge member. The exemplary device may then be pressed substantially towards the base of the receiver to cause the trim edge member to be secured in the receiver. For example, by way of illustration and not limitation, the exemplary device may be pressed towards the base of a clip embedded in interior foam to cause a plastic bead to be secured in the clip. The exemplary profile engagement portion may be slid along the length of one or more trim edge members to secure each trim edge member in its entirety to any number of receivers, thus causing trim and duon attached to the trim edge member to be tightly secured with respect to interior material of the seat. The exemplary device may also be rotated and/or pulled away from the base of a clip to dislodge an attached trim edge member, such as when removal of a seat cover is required.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 5:
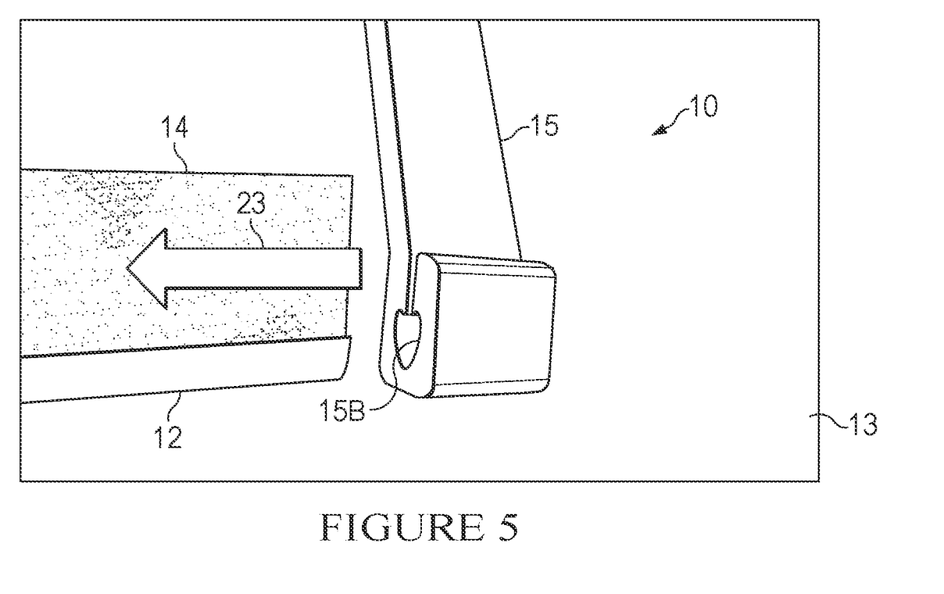
FIG. 5 is a front perspective view of the FIG. 1 embodiment wherein the exemplary device for setting or removing trim is shown in close proximity to the duon and trim edge member.
Figure 6:
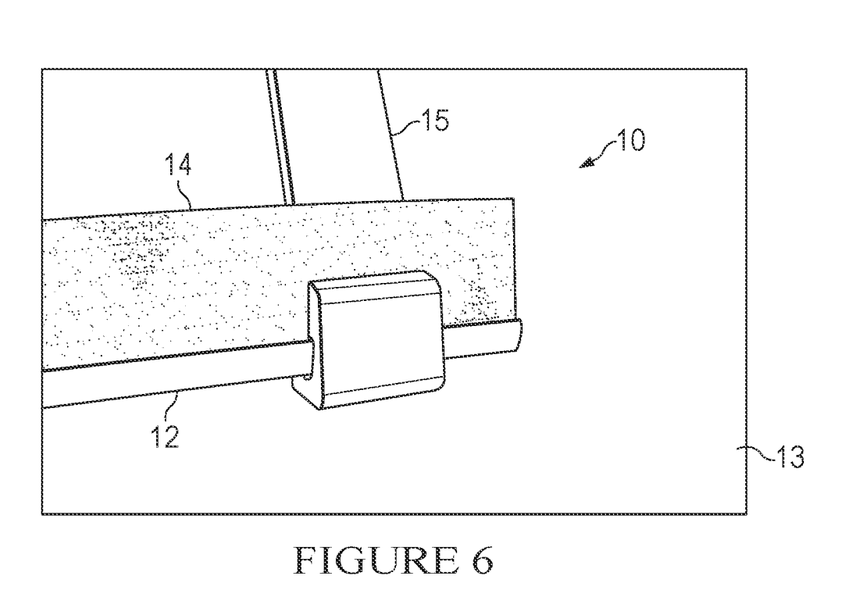
FIG. 6 is a front perspective view of the FIG. 5 embodiment wherein the exemplary device for setting or removing trim is shown having been positioned along a length of the duon and trim edge member.
Figure 7:
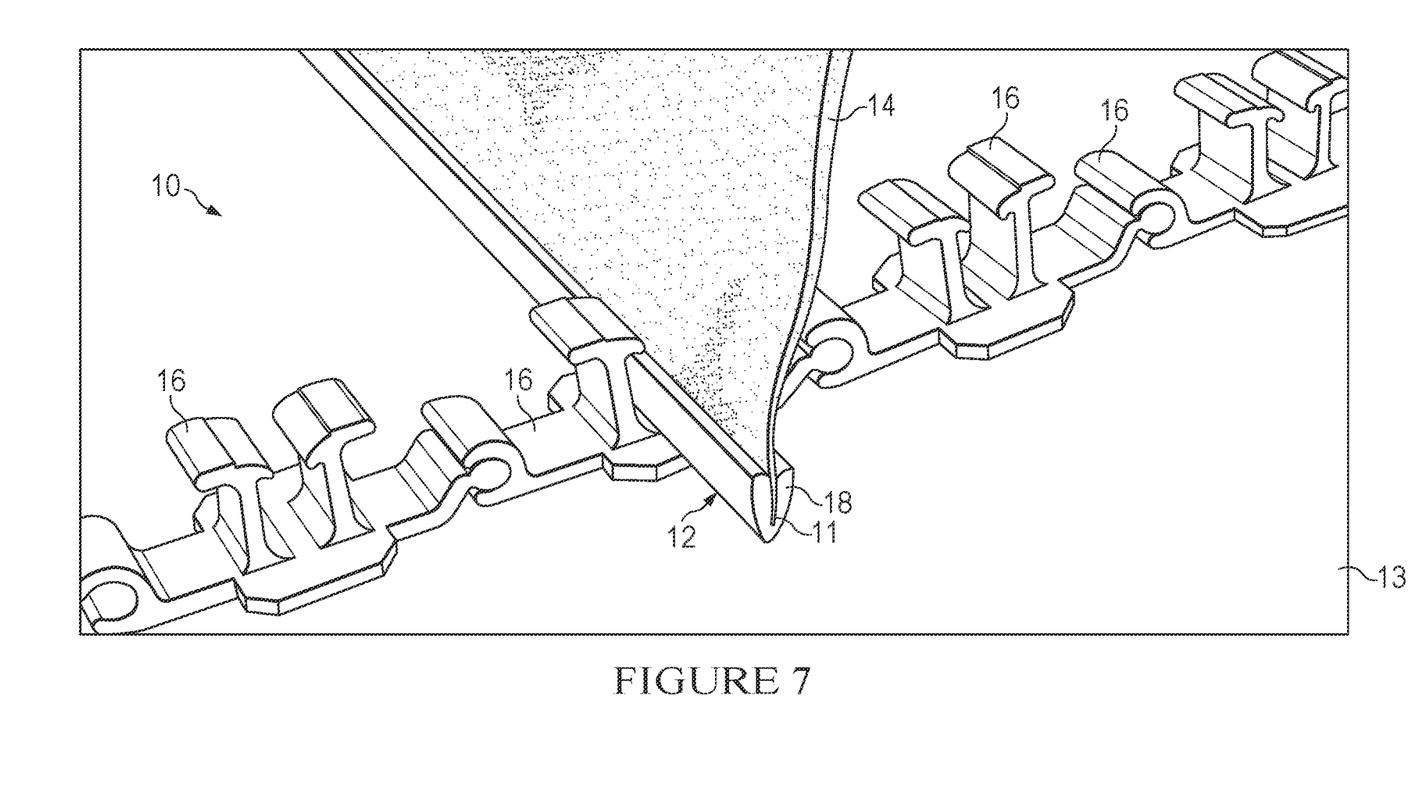
FIG. 7 is a front perspective view of an exemplary duon and trim edge member secured in an exemplary receiver.

Referring now to FIGS. 1-7, an exemplary beaded duon 10 for trim setting is shown. In preferred embodiments, a duon 14 may have a trim edge member 12 secured thereto along an edge of the duon 14. The duon 14 may comprise fabric, textile, cloth or the like. Referring specifically to FIG. 7, the trim edge member 12 may comprise a bead having a narrow channel 11 positioned between walls 18. The trim edge member 12 may comprise any number of different plastics, or other firm yet moderately pliable materials. The trim edge member 12 may be secured to the duon 14 by tension in the trim edge member 12 causing pressure to be applied by the walls 18 to the edge of the duon 14 positioned in the channel 11. The trim edge member 12 may further be secured to the duon 14 by thread, adhesive, or the like. It will be apparent to one of ordinary skill in the art that there may be any number of different materials and/or techniques available to cause the trim edge member to be secured to the duon without departing from the scope of the present invention.

Referring again to FIGS. 1-7, the duon 14 may be attached to an outer layer of a seat (not shown) by thread, adhesive, or the like to define a portion of the trim. The trim edge member 12 may be configured to be inserted into a receiver 16. It is not intended that the present invention be limited to the trim edge member configuration shown. It will be apparent to one of ordinary skill in the art that any number of different materials and/or configurations may be employed to define a firm yet moderately pliable region along the edge of the trim, wherein portions of said region may be inserted into any number of different receivers.

The receivers 16 may comprise one or more clips, each of which may comprise firm yet moderately pliable material, such as by way of example and not limitation, plastic material. In the embodiments shown in FIGS. 1-7, the one or more receivers 16 have been temporarily positioned on a large, rigid surface 13, but in certain exemplary embodiments, the receivers 16 are secured within or in close proximity to interior foam of a seat, such as, by way of example and not limitation, foam of an automobile seat cushion or seat back. In other embodiments, the receivers may comprise any number of different clips, catches, snaps, hooks, clasps, or the like configured to be secured at any number of different attachment regions of a seat.

Figure 1:
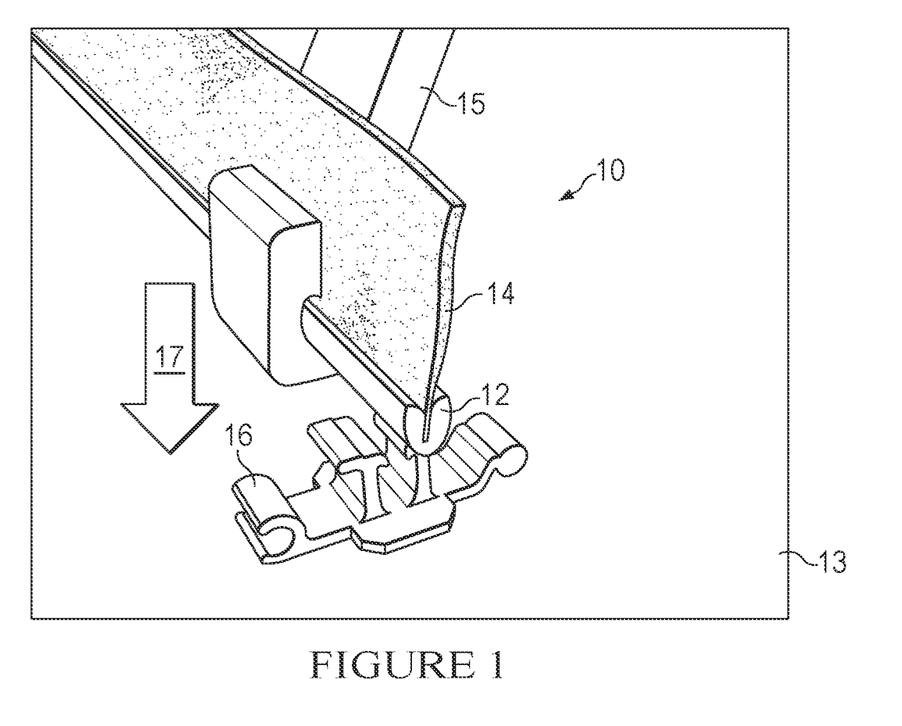
FIG. 1 is a front perspective view of an exemplary duon and trim edge member in proximity to a receiver, wherein the duon and trim edge member are engaged by an exemplary device for setting or removing trim.
Figure 2:
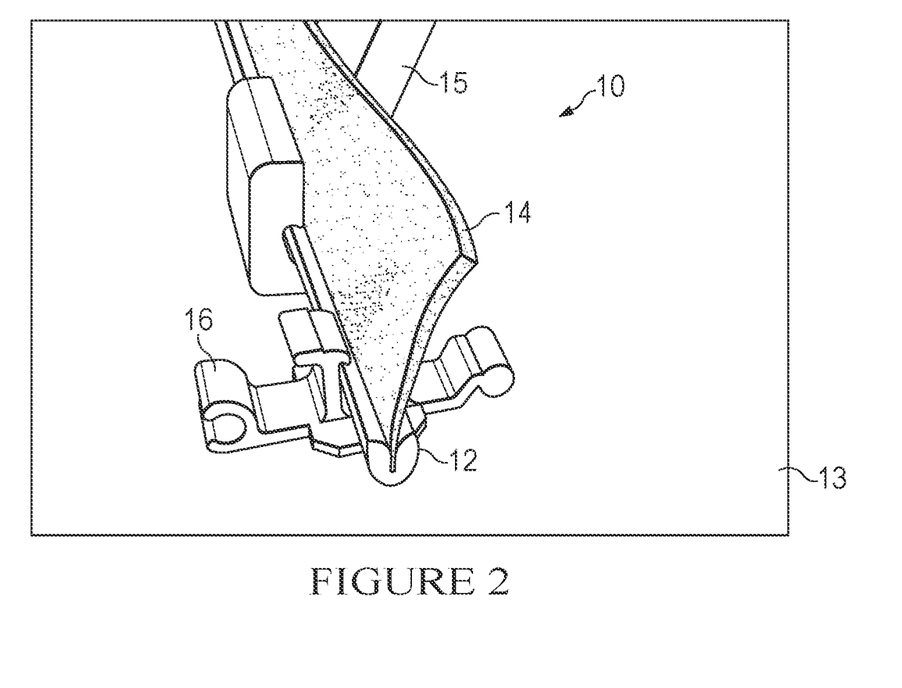
FIG. 2 is a front perspective view of the FIG. 1 embodiment, wherein the trim edge member is secured in the receiver.

Referring specifically to FIGS. 1, 2, and 7, trim installation may be achieved by inserting portions of trim edge member(s) 12 into respective receivers 16 across an entire perimeter of a portion of a seat comprising foam or other soft material. After the trim edge member 12 is inserted into the receiver 16, the trim edge member 12 may be substantially immobilized. A significant amount of force may be required to insert the trim edge member(s) 12 into the receiver(s) 16, which may cause the trim to be tightly secured around the seat. Likewise, a significant amount of force may be required to dislodge the trim edge member(s) 12 from the receiver(s) 16, which may be necessary to remove the trim from the seat.

Referring now specifically to FIG. 1, directional force (illustrated in a direction substantially perpendicular to the receiver 16 by arrow 17) from an exemplary device for setting or removing seat trim 15 may be required to secure trim edge member 12 of duon 14 to the receiver 16. FIG. 2 illustrates an exemplary result of an exemplary trim edge member 12 of duon 14 having been clipped into place in receiver 16 by the action of an exemplary device 15.

Figure 3:
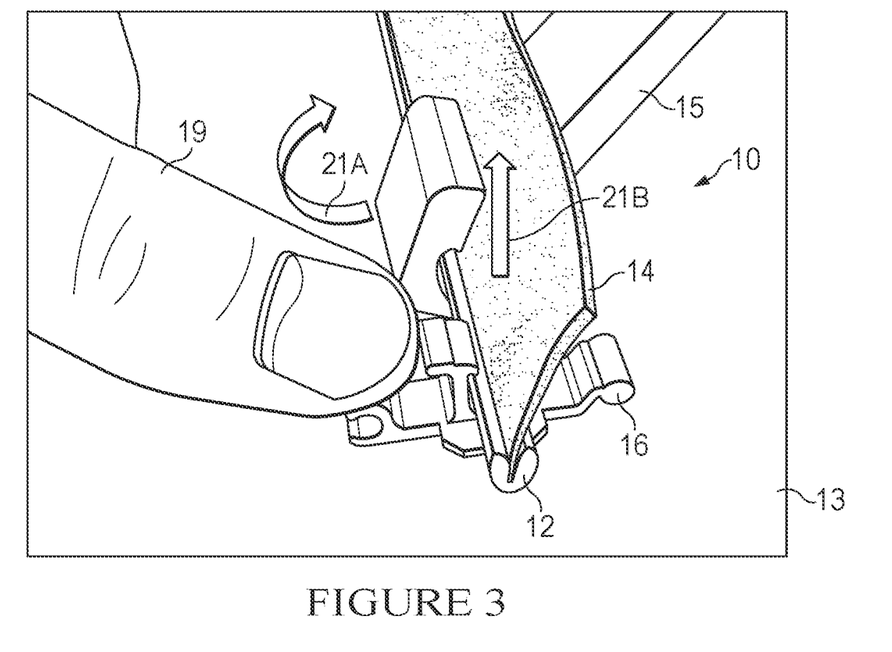
FIG. 3 is a front perspective view of the FIG. 2 embodiment, wherein the trim edge member is acted on by the exemplary device for setting or removing trim to cause the trim edge member to be released from the receiver.
Figure 4:
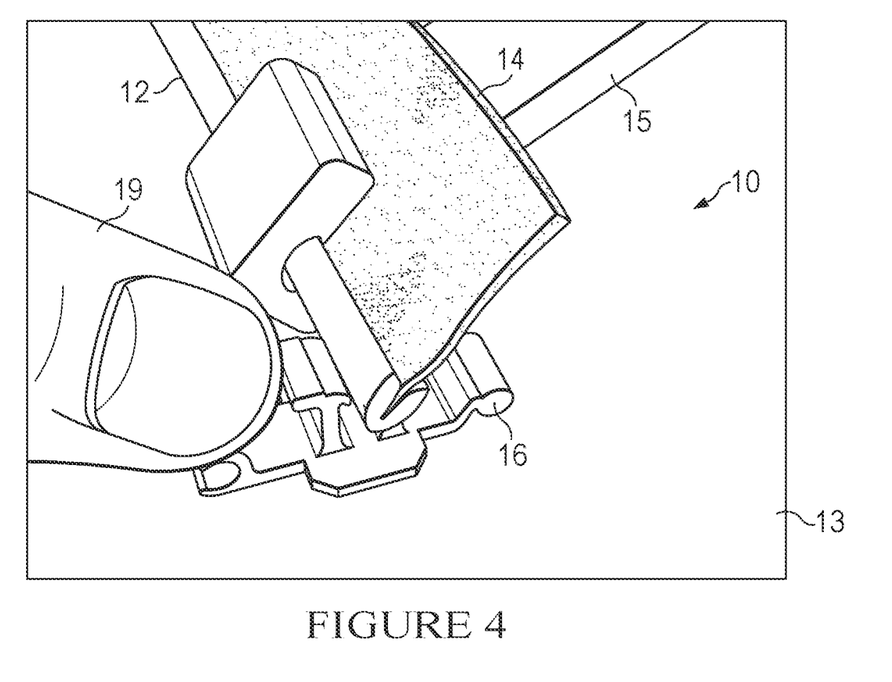
FIG. 4 is a front perspective view of the FIG. 3 embodiment wherein the trim edge member is shown having been released from the receiver.

Referring now to FIGS. 3 and 4, torque (direction of which is illustrated by way of example and not limitation by arrow 21A) may be generated by action of the exemplary device 15 to permit the trim edge member 12 of duon 14 to be dislodged from the receiver 16. Directional force (illustrated in a direction substantially perpendicular to the receiver 16 by arrow 21B) may also be applied in temporal proximity to the generation of torque to further cause the duon 14 and trim edge member 12 to be removed from the receiver 16. A user 19 may be permitted to apply pressure to the receiver 16 while force is applied to the trim edge member 12 to prevent the receiver 16 from damaging interior foam (not shown), tearing out of interior foam, or the like. FIG. 4 specifically illustrates an exemplary result of an exemplary trim edge member 12 of duon 14 having been removed from the receiver 16 by action of the exemplary device 15.

FIG. 5 illustrates an exemplary device 15 configured to engage a duon 14 and trim edge member 12 at a profile engagement portion 15B of the exemplary device 15. In this particular embodiment, the profile engagement portion 15B may be slid over the profile of the trim edge member 12 and duon 14, and thereafter may be freely slid along (direction of which is illustrated by way of example and not limitation by arrow 23) a length of the trim edge member 12. FIG. 6 illustrates an exemplary device 15 that has been positioned at a certain length of the trim edge member 12, wherein the trim edge member 12 is configured to be inserted into a receiver. Referring now to FIGS. 6 and 7, once the exemplary trim edge member 12 of duon 14 is secured to (or removed from) a particular receiver, the exemplary device 15 may be slid in proximity to another receiver for additional securement(s) (or removal(s)), allowing for expedited installation (or removal) of trim. The exemplary device 15 may be slid off of the trim edge member 12 and duon 14 when installation or removal is completed.

Figure 8:
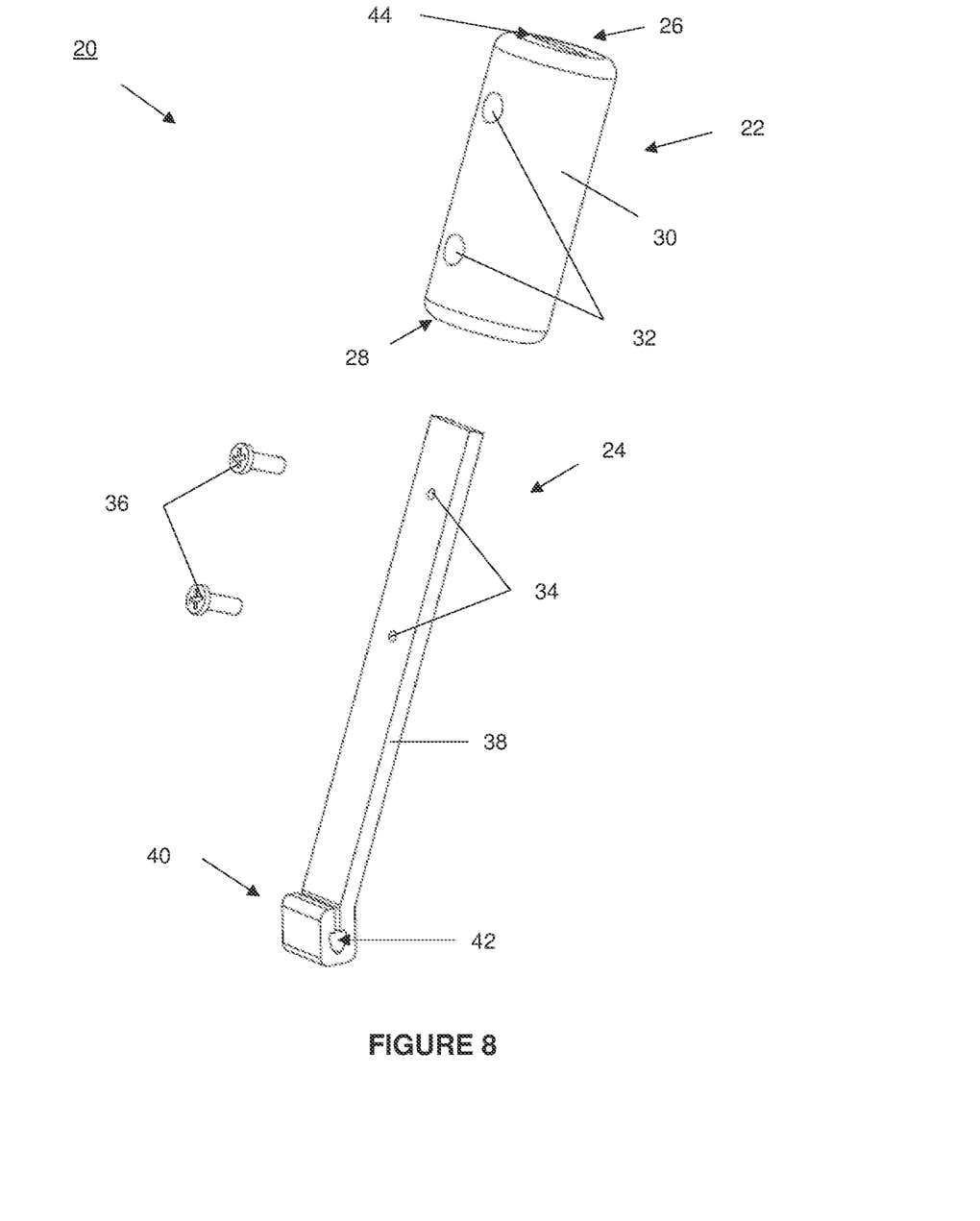
FIG. 8 is a front exploded perspective view of another exemplary device for setting or removing trim.

FIG. 8 shows an exploded view of another exemplary device 20 for setting or removing seat trim. In exemplary embodiments of the present invention, devices are configured to permit any user to insert trim edge members into receivers and remove trim edge members from receivers with ease, and without the use of additional machinery. A handle 22 of device 20 may include an upper portion 26, a lower portion 28, a body 30, handle apertures 32, and an insert channel 44. In preferred embodiments, any number of different inserts of various lengths, shapes and sizes may each be configured to be connected with the handle 22. In the FIG. 8 embodiment, an insert 24 is configured to have a portion thereof inserted into the insert channel 44 of the handle 22, wherein the aforementioned portion of the insert 24 may extend a length from the lower portion 28 of the handle 22 to the upper portion 26 of the handle 22. Insert apertures 34 may be positioned on the handle body 38, and may be configured to be aligned with the handle apertures 32. One or more fasteners 36 may be employed to cause securement of the insert 24 to the handle 22.

In certain embodiments, the handle 22 may weigh approximately 0.09 Kg. Furthermore, in certain embodiments, the insert 24 may weigh approximately 0.02 Kg. It is not intended that the present invention be limited to the particular handle and insert configurations shown and described, nor is it intended that the present invention be limited to the use of fasteners to secure an insert to a handle. The handle and the insert may each be any number of different shapes, weights, sizes, or the like without departing from the scope of the invention. Furthermore, by way of example and not limitation, securement of the insert to the handle may also be achieved by clips, clamps, pins, buckles, or the like. It will also be apparent to one of ordinary skill in the art that an arm having an arm channel and the handle are not required to define independent objects adapted to be detached from one another. For example, by way of illustration and not limitation, in some embodiments, the handle and the arm may define a single contiguous object.

Both the handle 22 and the insert 24 may each comprise any number of different substantially rigid materials, including by way of example and not limitation, metal alloys, plastics, composite material, or the like. The handle 22 and the insert 24 may be formed from injection molding, compression molding, transfer molding, forging, additive manufacturing, carpentry, some combination thereof, and/or any number of other manufacturing techniques. Each insert of any number of various different sizes may be configured to install trim edge members and duons of a particular size and configuration range. Where one insert does not meet the size and configuration requirements of a particular duon and trim edge member, that insert may be replaced with an alternative insert that does meet the size and configuration requirements of the particular trim edge member. For example, by way of illustration and not limitation, where a certain beaded duon profile requires a certain insert 24 having a particular profile engagement portion 40 comprising an arm channel 42 shaped to receive the bead and duon, that particular insert may be attached to the exemplary handle 22 by engagement of one or more fasteners 36 in apertures 32, 34. The apertures 32, 34 may be threaded to permit the use of a screwdriver or the like to position a fastener 36 in each aperture 32, 34. An insert 24 may readily be removed from the handle 22 by removing the fasteners 36 from each aperture 32, 34.

Figure 9:
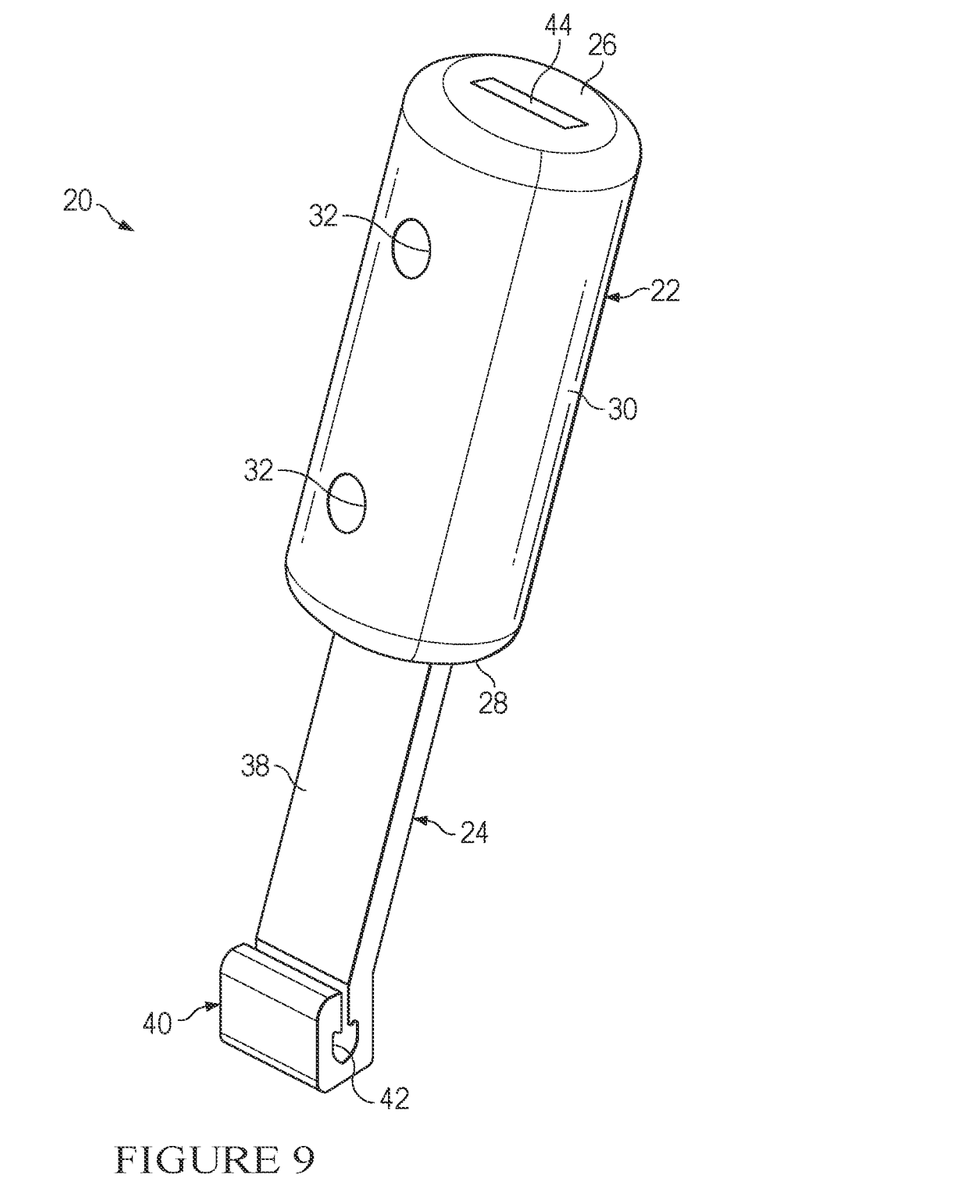
FIG. 9 is a front perspective view of the FIG. 8 embodiment, wherein the embodiment is fully assembled.
Figure 10:
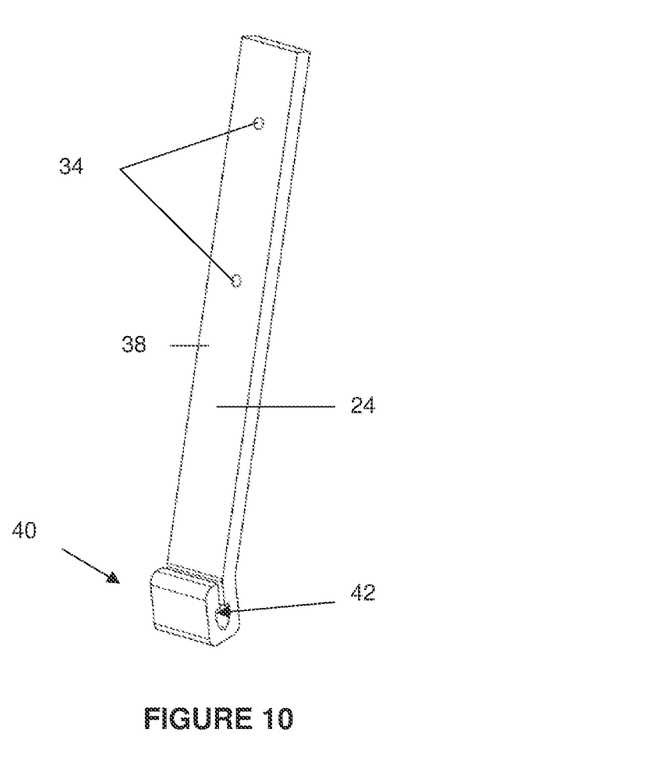
FIG. 10 is a front perspective view of an exemplary insert of the FIG. 8 embodiment.
Figure 11:
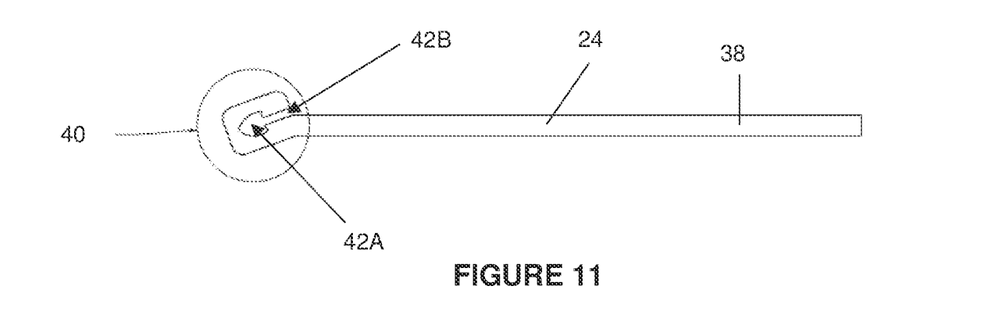
FIG. 11 is a right-side view of the exemplary insert of the FIG. 10 embodiment.
Figure 12:
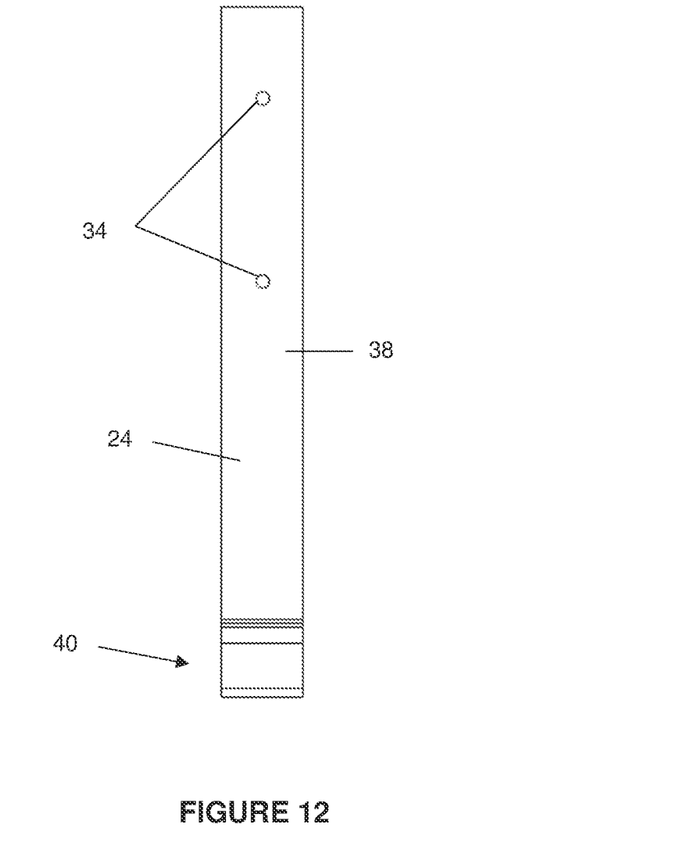
FIG. 12 is front view of the exemplary insert of the FIG. 10 embodiment.
Figure 13:
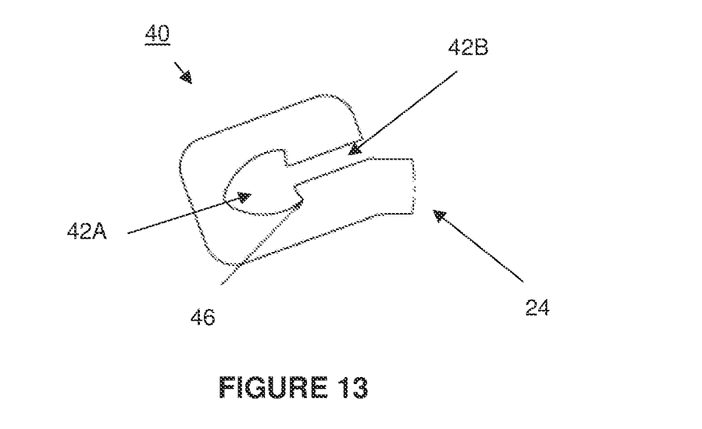
FIG. 13 is a right-side view of an exemplary profile engagement portion of the exemplary insert of the FIG. 10 embodiment.
Figure 14:
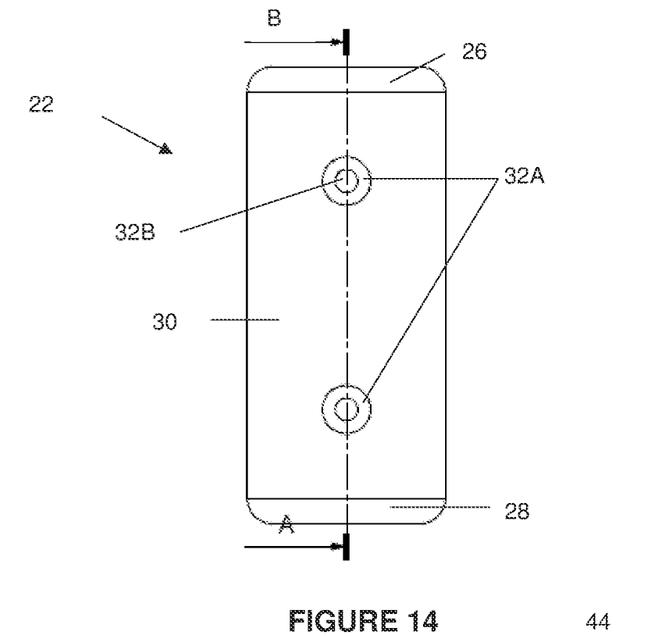
FIG. 14 is a front view of an exemplary handle of the FIG. 8 embodiment.
Figure 15:
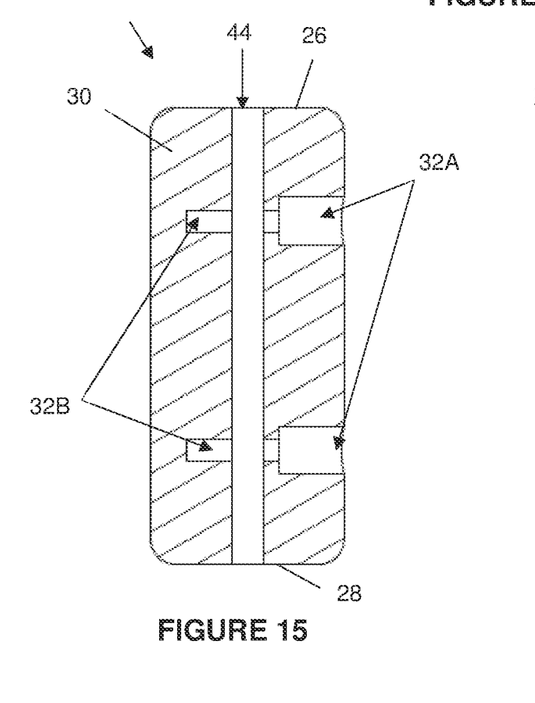
FIG. 15 is a left-side, cross sectional plan view of the exemplary handle of the FIG. 14 embodiment.
Figure 16:
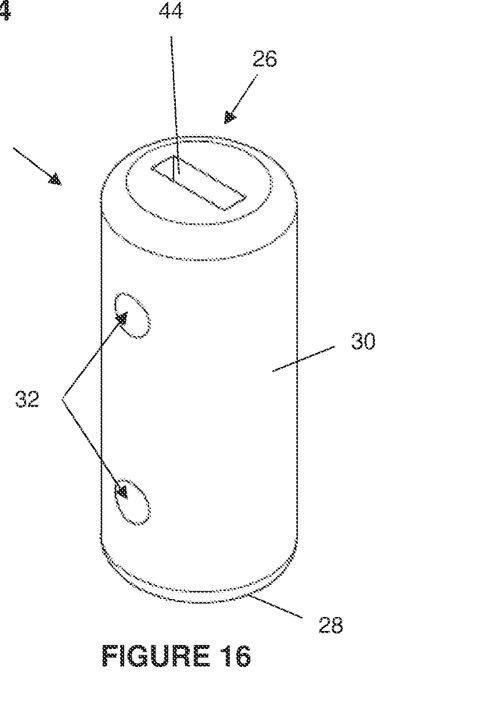
FIG. 16 is a front perspective view of the exemplary handle of the FIG. 14 embodiment.
Figure 17:
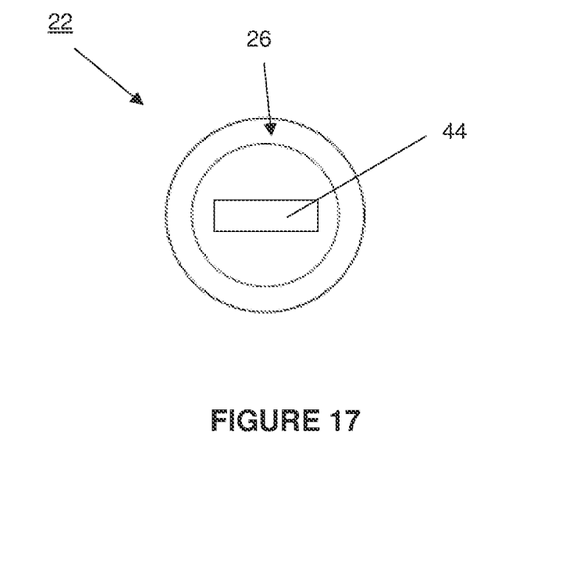
FIG. 17 is a top view of the exemplary handle of the FIG. 14 embodiment.

Referring now to FIG. 9, a fully assembled device 20 of the FIG. 8 embodiment is shown, wherein an insert 24 comprises a particular profile engagement portion 40 including an arm channel 42. In the embodiment shown, the handle 22 having a body 30, lower portion 28, and upper portion 26 is affixed to the insert 24 by action of fasteners (not shown) in handle apertures 32. A portion of the insert 24 is secured in an insert channel 44 between the lower portion 28 and upper portion 26 of the handle 22. Referring now to FIGS. 7 and 9, the profile engagement portion 40 of the insert 24 may be slid over a profile of a trim edge member 12 to cause the trim edge member 12 to be positioned in the arm channel 42 of the profile engagement portion 40. A user may act on the device 20, preferably at the handle 22, to cause the profile engagement portion 40 to slide along a length of the trim edge member 12. Movement of the profile engagement portion 40 away from the trim edge member 12 may be substantially restricted when the trim edge member 12 is positioned in the arm channel 42.

A user may act on the device 20, preferably at the handle 22, to cause the profile engagement portion 40 to exert significant force on the trim edge member 12. For example, by way of illustration and not limitation, the user may cause the profile engagement portion 40 to exert significant torque on the trim edge member 12 or force on the trim edge member 12 in directions approximately orthogonal to a receiver 16 during trim installation or removal. In preferred embodiments, the device 20 is configured to require only minimal effort from the user to have significant force exerted at the profile engagement portion 40. For example, by way of illustration and not limitation, the elongated, angled shape of the body 38 of the insert 24 with respect to the profile engagement portion 40 may allow for a significant pivot moment at the profile engagement portion 40 if the device 20 is rotated to exert force on the trim edge member 12. Pivot moment is the product of distance from where force is applied to where force is exerted multiplied by the quantity of force applied, thus the device 20 may permit a maximum pivot moment by the user acting on the handle 22. The shape of the handle 22 may allow for the user to place his or her entire hand(s) on the handle 22, promoting maximum distribution of force over the surface of the handle 22. Certain exemplary handles may include finger grooves, grip material, or the like to optimize a user's ability to grip the surface of the handle.

The profile engagement portion 40 having an arm channel 42 with a trim edge member 12 positioned therein may be placed in close proximity to a receiver 16. To install trim, the exemplary device 20 may then be pressed substantially towards the base of the receiver 16 to cause the trim edge member 12 to be secured in the receiver 16. For example, by way of illustration and not limitation, the exemplary device 20 may be pressed substantially towards the base of a clip embedded in interior foam to cause a plastic bead to be secured in the clip. The profile engagement portion 40 may be slid along the length of one or more trim edge members 12 to secure each trim edge member 12 in its entirety to any number of receivers 16, thus causing trim and duon 14 attached to the trim edge member 12 to be tightly secured with respect to interior material of the seat (not shown). To remove trim, the exemplary device 20 may be rotated and/or pulled substantially towards the opening of the receiver 16 to cause the trim edge member 12 to be dislodged from the receiver 16. The profile engagement portion 40 may be slid along the length of one or more trim edge members 12 to dislodge each trim edge member 12 in its entirety from any number of receivers 16, thus permitting trim and duon 14 attached to the trim edge member 12 to be removed from the seat (not shown).

FIGS. 10-13 illustrates various views of an exemplary insert 24 of the FIG. 2 embodiment comprising a body 38, insert apertures 34, and a profile engagement portion 40 defining an arm channel 42. Referring now to FIGS. 7, 9-11 and 13, the arm channel 42 of the profile engagement portion 40 may include a wide region 42A configured to receive and slide along the trim edge member 12, and a narrow region 42B separated from the wide region 42A by ridge(s) 46. The narrow region 42B may be configured to move along the duon 14 without restricting the ability of the profile engagement portion 40 to slide along a length of the trim edge member 12. The narrow region 42B may also be sufficiently narrow to restrict the trim edge member from being vertically dislodged from the profile engagement portion 40 during trim installation or removal. The wide region 42A may be sized to permit certain trim edge members 12 to be positioned therein. The profile engagement portion 40 including ridge(s) 46 may direct force from the device 20 to the trim edge member 12, such as force necessary to insert or dislodge the trim edge member 12 with respect to a receiver 16.

FIGS. 14-17 illustrate various views of an exemplary handle 22 of the FIG. 8 embodiment. The handle 22 may have a substantially symmetrical body 30 extending from a lower portion 28 to an upper portion 26 (as demonstrated by central line from A to B), and including an interior insert channel 44. The handle 22 may further include a plurality of handle apertures 32 providing for connection between the handle 22 and an insert. Each handle aperture 32 may comprise a wide region 32A configured to receive a fastener and restrict a shank and head of a fastener from moving a certain distance past the surface of the body 30 of the handle 22. Each handle aperture 32 may further comprise a narrow region 32B including internal or female threads configured to receive complementary external or male threads positioned on a pitch of a fastener.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A device for installing or removing seat trim comprising:
   a handle; and
   an insert comprising an insert body and a profile engagement portion, the profile engagement portion defining an arm channel having a wide region and a narrow region;
   wherein the insert and the handle are adapted to be attached to one another;
   wherein the insert and the handle are adapted to be detached from one another;
   wherein the wide region of the arm channel is adapted to surround a portion of a trim edge member; and
   wherein the profile engagement portion is adapted to direct force to the trim edge member to cause the trim edge member to at least one selected from the group of attach to a receiver and detach from a receiver.

2. The device of claim 1 wherein:
   the handle further comprises an insert channel adapted to receive a portion of the insert.

3. The device of claim 1 wherein:
   the handle further comprises at least one handle aperture; and
   the insert further comprises at least one insert aperture configured to align with the at least one handle aperture;
   wherein a fastener is configured to be positioned in each of the at least one handle aperture and the at least one insert aperture to cause the handle and the insert to be attached to one another.

4. The device of claim 2 wherein:
   the insert channel is configured to receive a portion of the insert extending a length from a lower portion of the handle to an upper portion of the handle.

5. The device of claim 1 wherein:
   the insert body and the profile engagement portion are configured to form an obtuse angle with respect to one another.

6. The device of claim 1 wherein:
   the narrow region of the arm channel is configured to permit a portion of a duon to be positioned therein.

7. The device of claim 1 wherein:
   the handle is adapted to permit a user to place a hand thereon for applying force thereto.

8. A device for installing or removing seat trim comprising:
   a handle; and
   an arm comprising an arm body and a profile engagement portion, the profile engagement portion defining an arm channel;
   wherein the arm and the handle are adapted to be connected to one another;
   wherein a portion of the arm channel is adapted to surround a portion of a trim edge member; and
   wherein the profile engagement portion is adapted to direct force to the trim edge member to cause the trim edge member to at least one selected from the group of attach to a receiver and detach from a receiver.

9. The device of claim 8 wherein:
   the arm comprises an insert configured to be detached from the handle.

10. The device of claim 8 wherein:
    the arm channel comprises a wide region adapted to surround a portion of a trim edge member, and a narrow region configured to permit a portion of a duon to be positioned therein.

11. The device of claim 8 wherein:
    the arm body and the profile engagement portion are configured to form an obtuse angle with respect to one another.

12. The device of claim 9 wherein:
    the handle further comprises an insert channel adapted to receive a portion of the arm.

13. The device of claim 12 wherein:
    the insert channel is configured to receive a portion of the arm extending a length from a lower portion of the handle to an upper portion of the handle.

14. A method for installing or removing seat trim comprising:
    providing a handle; and
    providing an insert comprising an insert body and a profile engagement portion, wherein the profile engagement portion defines an arm channel having a wide region and a narrow region;
    causing the insert and the handle to be adapted to be attached to one another;
    causing the insert and the handle to be adapted to be detached from one another;
    causing the wide region of the arm channel to be adapted to surround a portion of a trim edge member; and
    causing the profile engagement portion to be adapted to direct force to the trim edge member to cause the trim edge member to at least one selected from the group of attach to a receiver and detach from a receiver.

15. The method of claim 14 further comprising:
    providing an insert channel in the handle, wherein the insert channel is adapted to receive a portion of the insert.

16. The method of claim 15 wherein:
    the insert channel is configured to receive a portion of the insert extending a length from a lower portion of the handle to an upper portion of the handle.

17. The method of claim 14 further comprising:
    providing at least one handle aperture on the handle;
    providing at least one insert aperture on the insert, wherein the at least one insert aperture is configured to align with the at least one handle aperture; and
    providing a fastener configured to be positioned in each of the at least one handle aperture and the at least one insert aperture to cause the handle and the insert to be attached to one another.

18. The method of claim 14 further comprising:
    causing the insert body and the profile engagement portion to be configured to form an obtuse angle with respect to one another.

19. The method of claim 14 wherein:
    the narrow region of the arm channel is configured to permit a portion of a duon to be positioned therein.

20. The method of claim 14 further comprising:
    causing the handle to be adapted to permit a user to place a hand thereon for applying force thereto.

* * * * *